United States Patent
Abebe et al.

(10) Patent No.: US 11,080,769 B2
(45) Date of Patent: Aug. 3, 2021

(54) SYSTEM, METHOD AND COMPUTER PROGRAM PRODUCT FOR A COGNITIVE MONITOR AND ASSISTANT

(71) Applicant: International Business Machines Corporation, Armonk, NY (US)

(72) Inventors: Ermyas Abebe, Carlton (AU); Mahathir Bin Ahmad Almashor, Airport West (AU); Adam Harley Eugene Eberbach, Surrey Hills (AU); Jorge Andres Moros Ortiz, Carlton (AU); Hidemasa Muta, Carlton (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/587,336

(22) Filed: Sep. 30, 2019

(65) Prior Publication Data

US 2020/0027144 A1    Jan. 23, 2020

Related U.S. Application Data

(63) Continuation of application No. 15/239,443, filed on Aug. 17, 2016, now Pat. No. 10,621,636.

(51) Int. Cl.
| | |
|---|---|
| *G06F 16/95* | (2019.01) |
| *G06Q 30/06* | (2012.01) |
| *G06Q 10/10* | (2012.01) |
| *G06Q 30/04* | (2012.01) |
| *G06F 16/9535* | (2019.01) |
| *G06F 16/335* | (2019.01) |
| *G06N 20/00* | (2019.01) |

(52) U.S. Cl.
CPC ........... *G06Q 30/06* (2013.01); *G06F 16/337* (2019.01); *G06F 16/9535* (2019.01); *G06Q 10/107* (2013.01); *G06Q 30/04* (2013.01); *G06N 20/00* (2019.01)

(58) Field of Classification Search
CPC .................................................... H04L 67/306
USPC ................................. 707/706, 797, 798, 800
See application file for complete search history.

(56) References Cited

U.S. PATENT DOCUMENTS

| | | | |
|---|---|---|---|
| 2008/0072158 A1* | 3/2008 | Samele | .................. H04L 51/04 |
| | | | 715/751 |
| 2010/0251305 A1 | 9/2010 | Kimble | |
| 2012/0096041 A1 | 4/2012 | Rao | |
| 2014/0101085 A1* | 4/2014 | Lu | ........................... G06N 5/02 |
| | | | 706/46 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Baoquoc N To
(74) *Attorney, Agent, or Firm* — Joseph Petrokaitis, Esq.; McGinn I.P. Law Group, PLLC.

(57) ABSTRACT

A cognitive assisting method, system, and computer program product, includes building a first cognitive profile of a first user by determining content with identifiable attributes that may be incorporated into the cognitive profile and detecting a current activity of the first user and continually finding a match to a second cognitive profile of a second user in a repository of cognitive profiles belonging to others.

20 Claims, 4 Drawing Sheets

(56) References Cited

U.S. PATENT DOCUMENTS

| | | | |
|---|---|---|---|
| 2015/0019273 A1* | 1/2015 | Grosz | G06Q 50/01 |
| | | | 705/5 |
| 2015/0058148 A1* | 2/2015 | Grosz | G06Q 30/0283 |
| | | | 705/26.2 |
| 2015/0286709 A1 | 10/2015 | Sathish et al. | |
| 2016/0048880 A1 | 2/2016 | Linden | |
| 2016/0103487 A1 | 4/2016 | Crawford et al. | |
| 2017/0093967 A1* | 3/2017 | Grosz | H04L 51/32 |
| 2017/0185917 A1 | 6/2017 | Chawla et al. | |

OTHER PUBLICATIONS

United States Notice of Allowance dated Aug. 14, 2019, in U.S. Appl. No. 15/239,443.

United States Office Action dated Apr. 16, 2019, in U.S. Appl. No. 15/239,443.

United States Office Action dated Jan. 7, 2019, in U.S. Appl. No. 15/239,443.

United States Office Action dated Sep. 5, 2018, in U.S. Appl. No. 15/239,443.

* cited by examiner

SYSTEM, METHOD AND COMPUTER PROGRAM PRODUCT FOR A COGNITIVE MONITOR AND ASSISTANT

CROSS-REFERENCE TO RELATED APPLICATIONS

The present application is a Continuation Application of U.S. patent application Ser. No. 15/239,443, filed on Aug. 17, 2016, the entire contents of which are hereby incorporated by reference.

BACKGROUND

The present invention relates generally to a cognitive assisting method, and more particularly, but not by way of limitation, to a system, method, and computer program for a cognitive process capable of monitoring a user's activities in day-to-day interaction to build a cognitive profile of the user for the user's intent of the activities.

Organizational knowledge is too broad and deep to be understood by any individual. Connections and opportunities, even in smaller companies, can be too numerous or complex for any individual to fully take advantage of them.

Conventional techniques consider presenting information across diverse communities to connect individuals with information. However, the conventional techniques only consider connecting user's with information by ingesting data, but do not consider continually monitoring and interacting with an individual. That is, the conventional techniques facilitate discovery and collaboration between individuals, to facilitate mentoring and eminence within an organization.

There is a need in the art to build user profiles to find connections between users within organizations on a deeper level based on an intent of the users activity.

SUMMARY

In an exemplary embodiment, the present invention can provide a computer-implemented cognitive assisting method, the method including determining an intent of a first user from an identifiable attribute of content associated with the first user, building a first cognitive profile of the first user based on the intent of the first user and the identifiable attribute of the content, and detecting a similarity between the intent of the first user in the first cognitive profile and a characteristic of a second cognitive profile of a second user stored in a database including a plurality of cognitive profiles.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
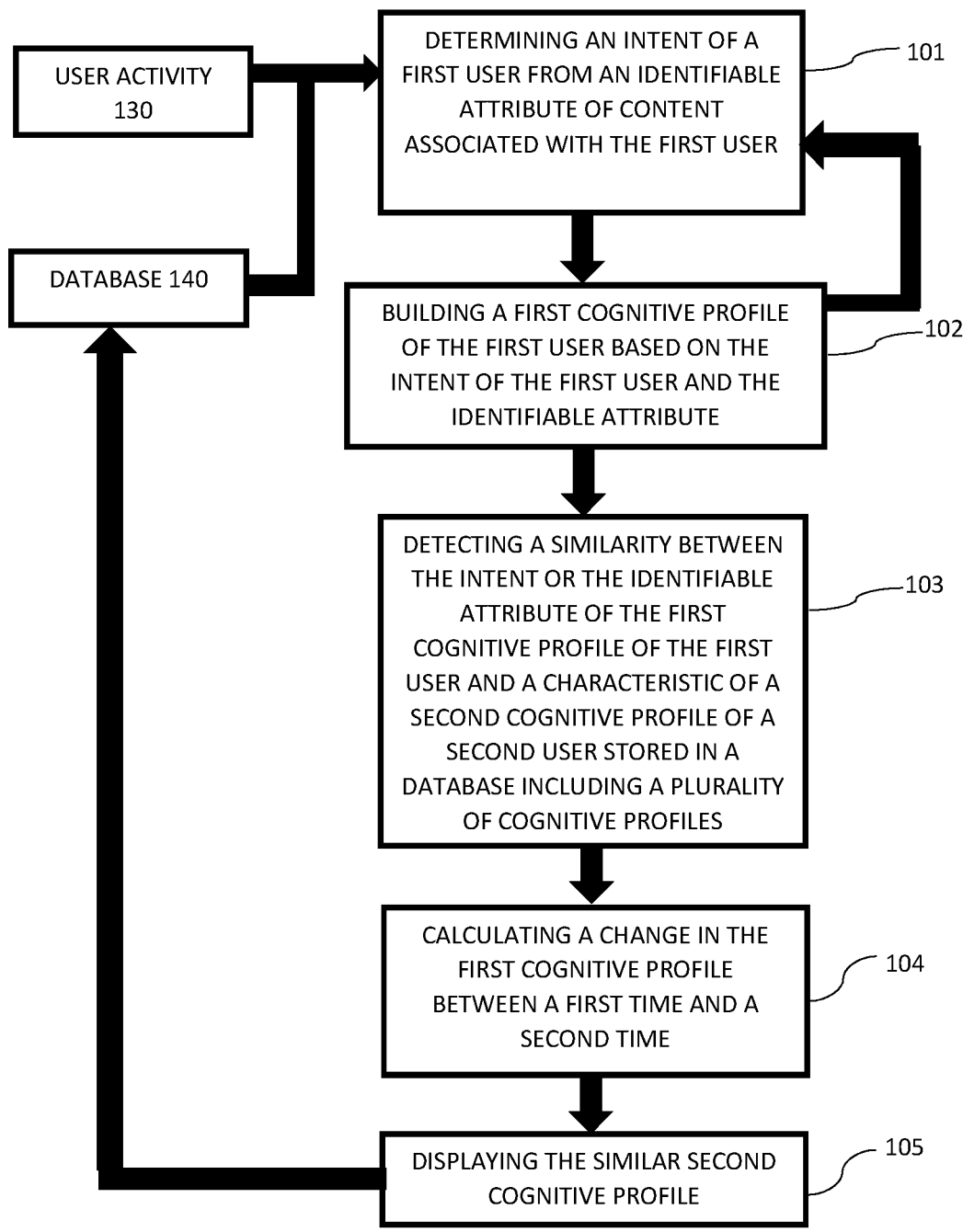
FIG. 1 exemplarily shows a high-level flow chart for a cognitive assisting method 100.

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the cognitive assisting method 100 includes various steps to monitor an individual's activities in day-to-day interaction with a computer and build a cognitive profile of the individual based on the intent of the individual to detect similarities between the user's intent and other cognitive user profiles to suggest a connection (e.g., collaboration). As shown in at least FIG. 2, one or more computers of a computer system 12 according to an embodiment of the present invention can include a memory 28 having instructions stored in a storage system to perform the steps of FIG. 1.

Thus, the cognitive assisting method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, an intent of a first user from an identifiable attribute of content (activities) associated with the first user is determined. For example, types of content can include a user's publication history, submitted disclosures, projects contributed to, education undertaken, manager, location, meetings attended, repositories committed to, web searches, social media interaction, emails authored, etc. Each type of content includes identifiable attributes based on user activity. That is, in step 101, content with identifiable attributes to infer an intent of the user is incorporated into the cognitive profile.

In some embodiments, the first user may be involved in an educational course about thermodynamics and a project for the course. The user may submit a project for the course (e.g., content) specifically regarding combustion equations for a two-cylinder engine and solving for the efficiency. In step 101, the identifiable attributes comprise the combustion equations, the two-cylinder engine, and efficiency of the engine. Based on the identifiable attributes, the intent of the user to solve for efficiency is determined by, for example, machine learning to infer the intent of the user.

In some embodiments, the content may include the educational course about thermodynamics and a project for the course. However, the project includes identifiable attributes about how to market and price a vehicle comprising a two-cylinder engine with a particular efficiency. In step 101, the intent of the user is determined to accurately price and market the vehicle rather than the intent to solve for efficiency of the engine. That is, the intent of the user is variable determined, even for a same type of content, based on the identifiable attributes of the content in step 101.

In some embodiments, a user can "self-select" types of content that are thought to be of interest to others, opting-in on a source-by-source or even document-by-document basis. For example, the user may not wish to include personal web searches for medical advice into the method 100. The "self-select" may be similar to the way in which individuals are encouraged to maintain personal profiles on an intranet directory (e.g., a work biography or curriculum vitae). Alternatively, an organization might require that all content be incorporated. That is, the user can selectively decide for which activities and content the user would like the cognitive profile to be built (as described later).

In step 102, a first cognitive profile of the first user is built based on the intent of the first user and the identifiable attribute. The first cognitive profile compiles a collection of the intent of the user associated with the identifiable attribute. It is noted that a cognitive profile is built for each of a plurality of users and stored in the database 140. The cognitive profiles comprise a mapping between the intent of the users and the identifiable attributes.

That is, the cognitive profile is generated from the everyday content and an inferred intent of the activity in step 101 undertaken by a person. Each kind of content may or may not be included in the profile. The inclusion of any content can depend on whether a module has been provided to integrate that kind of information and whether or not the user chooses to submit data to that module. The profile generated is continually updated as the user performs new activities and has new content. The profile overall is comprised of information submitted by the local monitoring process to the server containing the central repository of profiles (e.g., database 140).

In step 103, a similarity between the intent and/or the identifiable attribute of the first cognitive profile and a characteristic (e.g., a solution to the intent related to the identifiable attribute) of a second cognitive profile of a different user stored in the database 140 is detected.

For example, it is detected if the user's intent matches a characteristic in the central repository of cognitive profiles belonging to others. As profiles are found to contain matching areas of interest or intent, the results are displayed to the user. The results may be displayed as a subtle indication, for example a discrete alert that may be ignored or acted upon. Alternatively, the results can be displayed as a pop-up window for the user to decide the next action. Thus, the user is able to leverage the sum of organizational knowledge in a way that does not require the individual to possess all of that knowledge at any one time.

In some embodiments, if the determined intent comprises a deeper understanding of an engineering concept related to a vehicle when the user is composing an e-mail (e.g., content), a different cognitive profile including a characteristic related to the engineering concept for vehicles is detected as similar and displayed for the user to connect with in step 105.

In other words, in step 103, a cognitive profile from the database 140 having a similar characteristic related to the topic of the intent of the user is detected and displayed to the user. A characteristic comprises an identifiable characteristic of the content associated with the cognitive profile in the database 140 that may provide a solution or help to assist with the intent of the user. For example, the characteristic may include the education, expertise, availability, employment, etc. such that the cognitive profile indicates what types of connections can be made to help with the intent of the user.

In step 104, a change in the first cognitive profile of the first user is calculated between a first time and a second time after the first time. In other words, the change between a past intent or identifiable attribute to a new intent or new identifiable attribute is calculated.

In some embodiments, as a user's cognitive profile is changed over time, its content changes. Periodically, a change (delta) is calculated for the cognitive profile representing the change in the profile over time. Changes in the user's abilities, interests, projects, achievements, etc. are able to be extracted from the change. Information is extracted from the change and the cognitive profile is updated for each user presenting a concise summary of the user. For example, the change can trigger a fresh report or be able to update an existing report of the change in the user's profile. The report can be a document to publish on an internet web site in place of manually updating process such as a way for a user to generate a biography of the user for a company website. In some embodiments, the report can comprise a tool for management to obtain a summary of the capabilities available within their report structure.

In some embodiments, the more recent changes can be weighted more than changes from past data. For example, a change in project details that a user is working on can be weighted more for changes from projects in the last year versus from twenty years ago.

In some embodiments, a user may be searching for information on a topic (e.g., intent) in a web browser (e.g., content). A cognitive profile of the user has already been built over past uses. In step 103, similarities are detected between the intent of the user and certain cognitive profiles in the database 140 that include experts in that field within the organization about the topic that the user is searching. An alert may be displayed notifying the user of the existence of those individuals along with contact details for them. Alternatively, the user can be presented with links to relevant work by those individuals, or to code repositories containing useful code.

In some embodiments, the intent of the user can be determined from the user composing an e-mail via an email client. While writing, a similar cognitive profile is found from the database 140 and a message is delivered to the user indicating the similarity or match. On clicking the indicator, the user may be presented with relevant matches such as a list of projects with available source code, a list of patents or inventions, a list of experts that may be available to consult within the organization or a list of others that may be discussing or planning similar work, all related to the intent determined from the identifiable attributes of the e-mail. The user thus has access to a large range of organizational knowledge which may otherwise be undiscovered.

In another embodiment, a user may schedule a meeting on a certain topic and invite a number of other individuals. The method 100 may detect that there are experts within the organization based on a similarity between the user's cognitive profile and the experts cognitive profile who are available at that time and at a convenient location to attend the meeting. The user may then be notified that the presence of one or more of those experts could add substantially to the meeting based on a level of the similarity between the user's cognitive profile and the experts cognitive profile. At the conclusion of the meeting, the attendees would be considered to have absorbed at least some knowledge about the subject of the meeting, especially if a recognized expert had attended, and this would be updated in building the user's cognitive profile.

In some embodiments, a machine or network configuration may be utilized with the detecting a similarity between the intent of the first user in the first cognitive profile and a characteristic of a second cognitive profile of a second user stored in a database including a plurality of cognitive profiles such that a Graphical User Interface can display as a pop-up the similar user profiles that the user may select between. That is, the graphical user interface may display an alert notifying the user of the existence of those individuals along with contact details for them. It may also present links to relevant work by those individuals, or to code repositories containing useful code.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
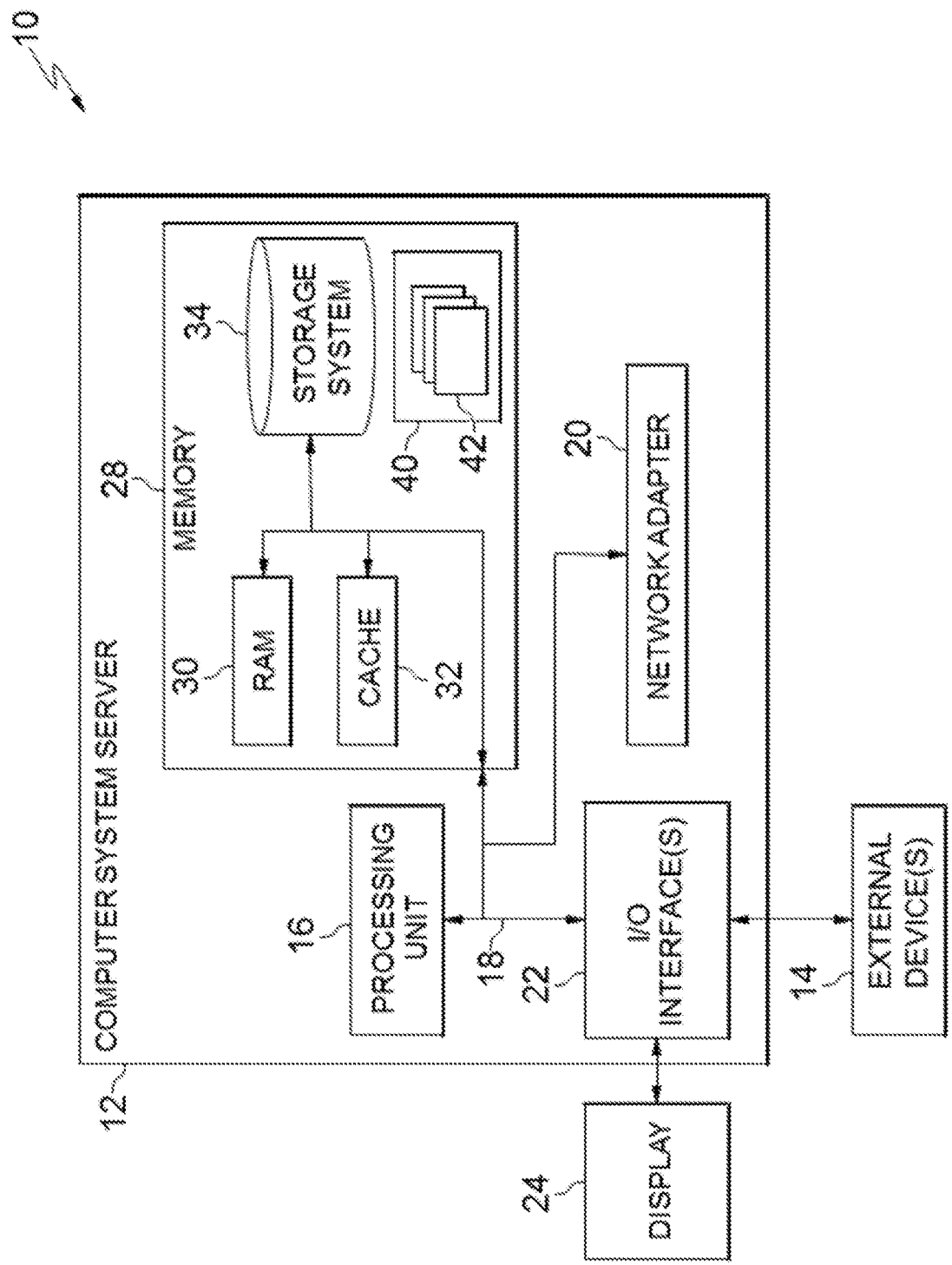
FIG. 2 depicts a cloud computing node according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein.

Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
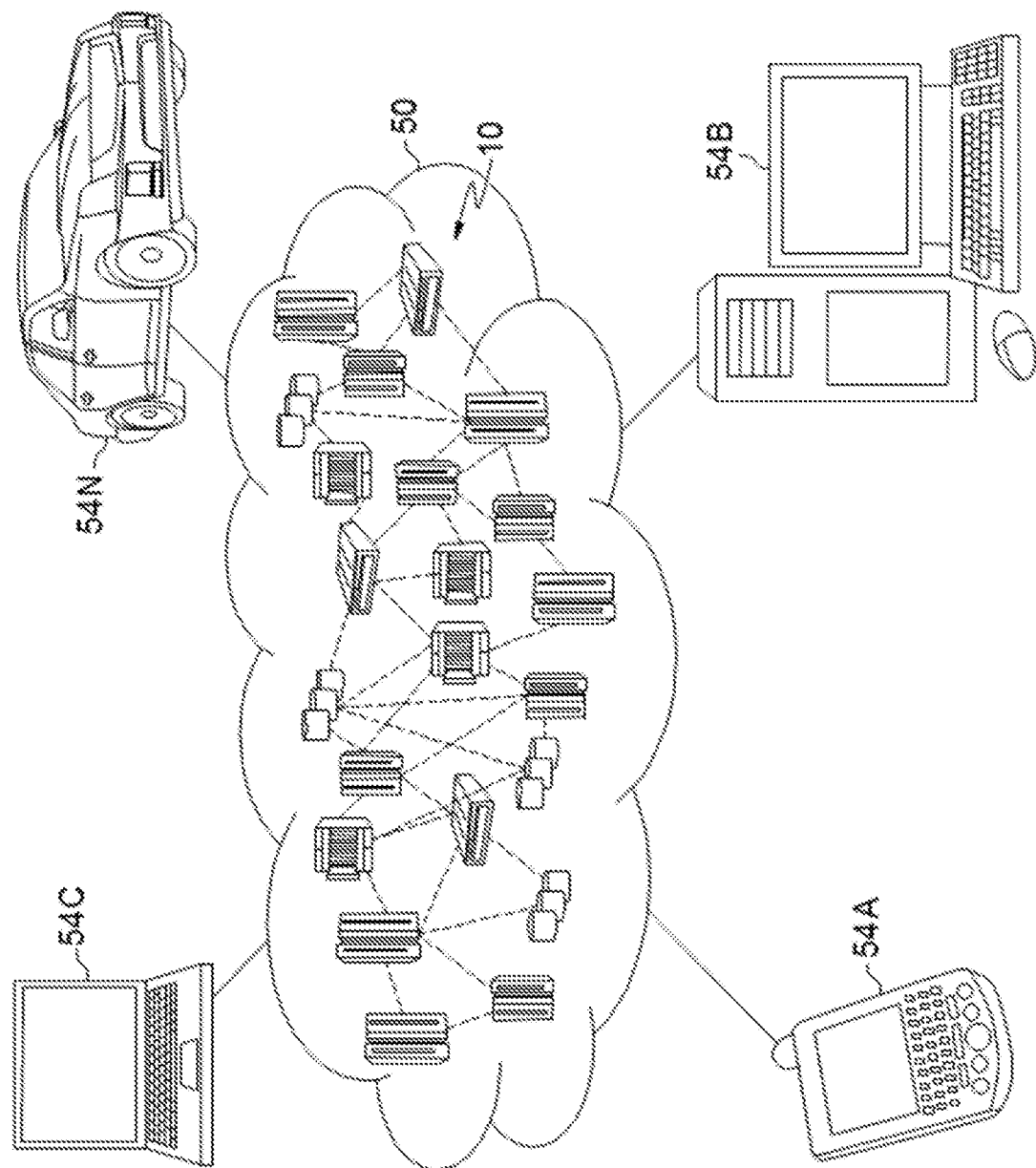
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
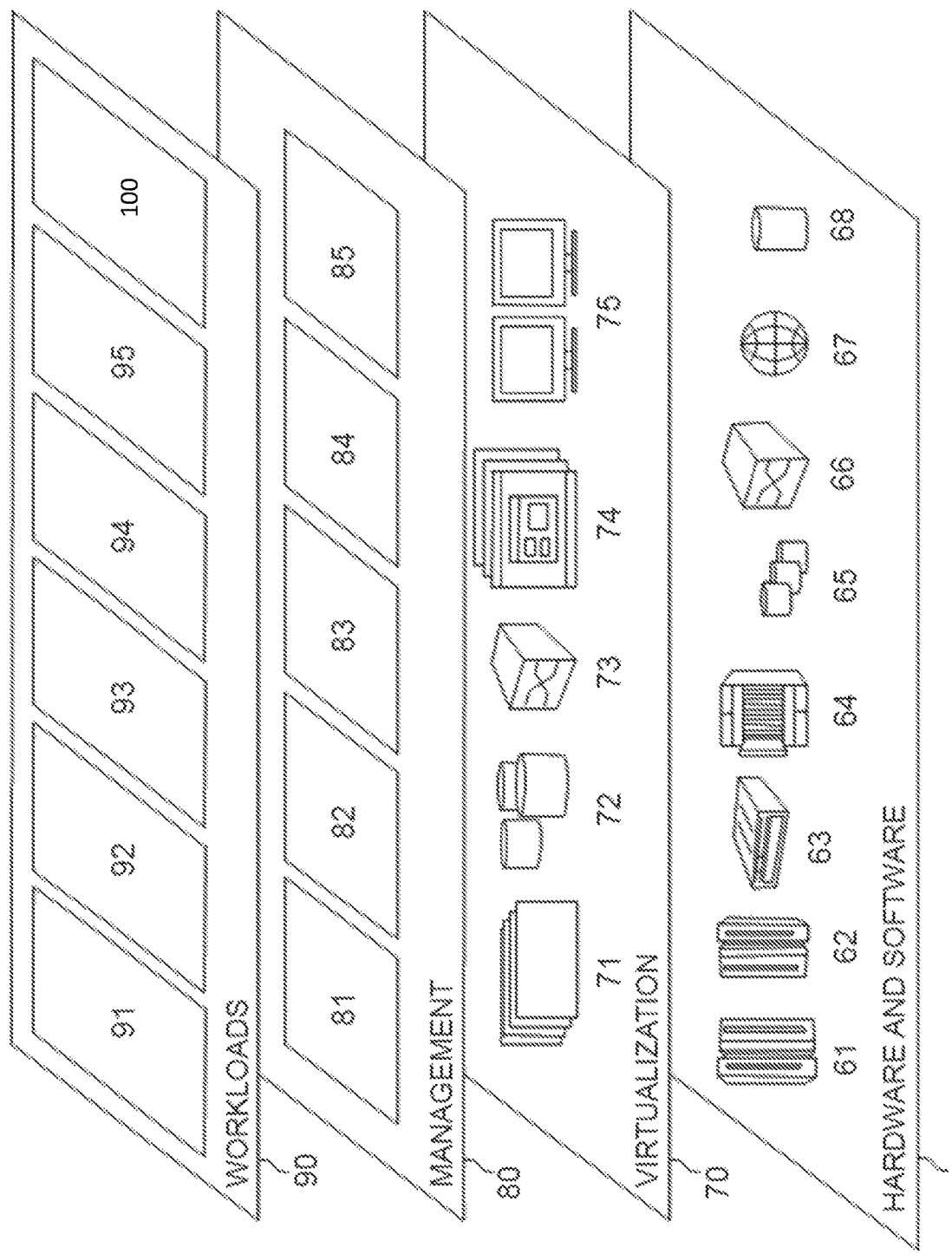
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the cognitive assisting method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented cognitive assisting method, the method comprising:
    building a first cognitive profile of a first user by determining content with identifiable attributes that are incorporated into the first cognitive profile;
    detecting a current activity of the first user and continually finding a match to a second cognitive profile of a second user in a repository of cognitive profiles; and
    finding an expert of the content in a vicinity of the current activity of the first user.

2. The computer-implemented method of claim 1, wherein the first user self-selects the content with which to build the first cognitive profile, and wherein the first cognitive profile is comprised of information submitted by a local monitoring process to a server containing the repository.

3. The computer-implemented method of claim 1, wherein, when the first user schedules a meeting on a certain topic and invites the second user, further detecting that there is the expert within the database who is available at a time of the meeting and is at a location to attend the meeting, and
    wherein a presence of the expert is notified to the first user and the second user.

4. The computer-implemented method of claim 1, wherein the user selectively decides an activity for the determining to associate content with the activity.

5. The computer-implemented method of claim 1, wherein the detecting detects a match of a type of content between the first cognitive profile and the second cognitive profile.

6. The computer-implemented method of claim 1, further comprising continuously determining content associated with a new activity of the user to increase an amount of content for building the first cognitive profile.

7. The computer-implemented method of claim 1, further comprising displaying a result indicating which content of the first cognitive profile of the user is similar to the characteristic of the second cognitive profile of the second user.

8. The computer-implemented method of claim 1, further comprising calculating a change in the first cognitive profile between a first time and a second time, the second time being after the first time.

9. The computer-implemented method of claim 8, wherein the change is displayed as a report indicating a plurality of new identifiable attributes.

10. The computer-implemented method of claim 1, wherein the intent is inferred based on the identifiable attribute of the content via machine learning.

11. The computer-implemented method of claim 1, embodied in a cloud-computing environment.

12. A computer program product for cognitive assisting, the computer program product comprising a computer-readable storage medium having program instructions embodied therewith, the program instructions executable by a computer to cause the computer to perform:
    building a first cognitive profile of a first user by determining content with identifiable attributes that are incorporated into the first cognitive profile;
    detecting a current activity of the first user and continually finding a match to a second cognitive profile of a second user in a repository of cognitive profiles; and
    networking an expert of the content of the current activity of the first user with the first user.

13. A cognitive assisting system, said system comprising:
    a processor; and
    a memory, the memory storing instructions to cause the processor to perform:
        building a first cognitive profile of a first user by determining content with identifiable attributes that are incorporated into the first cognitive profile;
        detecting a current activity of the first user and continually finding a match to a second cognitive profile of a second user in a repository of cognitive profiles; and
        finding an expert of the content in a vicinity of the current activity of the first user.

14. The system of claim 13, wherein the first user self-selects the content with which to build the first cognitive profile.

15. The system of claim 13, wherein, when the first user schedules a meeting on a certain topic and invites the second user, further detecting that there is the expert within the database who is available at a time of the meeting and is at a location to attend the meeting, and wherein a presence of the expert is notified to the first user and the second user.

16. The system of claim 13, wherein the user selectively decides an activity for the determining to associate content with the activity.

17. The system of claim 13, wherein the detecting detects a match of a type of content between the first cognitive profile and the second cognitive profile.

18. The system of claim 13, further comprising continuously determining content associated with a new activity of the user to increase an amount of content for building the first cognitive profile.

19. The system of claim 13, further comprising displaying a result indicating which content of the first cognitive profile of the user is similar to the characteristic of the second cognitive profile of the second user.

20. The system of claim 13, further comprising calculating a change in the first cognitive profile between a first time and a second time, the second time being after the first time.

* * * * *